US010658878B2

(12) United States Patent
Smith et al.

(10) Patent No.: US 10,658,878 B2
(45) Date of Patent: May 19, 2020

(54) WIRELESS CHARGING SYSTEM WITH TEMPERATURE SENSOR ARRAY

(71) Applicant: Apple Inc., Cupertino, CA (US)

(72) Inventors: J. Stephen Smith, San Jose, CA (US); Behrooz Shahsavari, Hayward, CA (US); Jacob E. Mattingley, Cupertino, CA (US); Joseph C. Doll, Mountain View, CA (US); Steven P. Hotelling, Los Gatos, CA (US); Siddharth Seth, Campbell, CA (US); Douglas J. Adams, Mountain View, CA (US); Michael A. Cretella, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/206,758

(22) Filed: Nov. 30, 2018

(65) Prior Publication Data

US 2020/0076244 A1     Mar. 5, 2020

Related U.S. Application Data

(60) Provisional application No. 62/726,124, filed on Aug. 31, 2018.

(51) Int. Cl.
*H02J 50/60* (2016.01)
*H02J 7/02* (2016.01)
*H02J 50/12* (2016.01)
*G01K 1/02* (2006.01)
*G01V 9/00* (2006.01)
*H01F 38/14* (2006.01)
*G01K 1/14* (2006.01)

(52) U.S. Cl.
CPC .............. *H02J 50/60* (2016.02); *G01K 1/026* (2013.01); *G01K 1/143* (2013.01); *G01V 9/005* (2013.01); *H01F 38/14* (2013.01); *H02J 50/12* (2016.02)

(58) Field of Classification Search
CPC ....................................................... H02J 50/60
USPC ........................................................ 320/108
See application file for complete search history.

(56) References Cited

U.S. PATENT DOCUMENTS 4,320,165 A     3/1982  Cash
6,781,056 B1 *  8/2004  O'Rourke ............ H05K 1/0212
                                                    174/255
9,570,918 B2    2/2017  Walley et al.
(Continued)

FOREIGN PATENT DOCUMENTS

EP          3050738 A1     8/2016

*Primary Examiner* — Jerry D Robbins
(74) *Attorney, Agent, or Firm* — Treyz Law Group, P.C.; Jason Tsai

(57) ABSTRACT

A wireless power transmitting device transmits wireless power signals to a wireless power receiving device. The wireless power receiving device has a rectifier and a wireless power receiving coil that receives wireless power signals. The wireless power transmitting device uses a layer of coils to transmit the wireless power signals. A dielectric layer in the wireless power transmitting device defines a charging surface that receives the wireless power receiving device. A layer of temperature sensors is interposed between the layer of coils and the dielectric layer. Control circuitry in the wireless power transmitting device uses temperature information from the temperature sensors to determine whether a foreign object such as a coin is present on the charging surface.

24 Claims, 20 Drawing Sheets

(56) References Cited

U.S. PATENT DOCUMENTS

| | | |
|---|---|---|
| 9,698,607 B2 | 7/2017 | Kesler et al. |
| 9,735,605 B2 | 8/2017 | Garcia Briz et al. |
| 9,893,549 B2 | 2/2018 | Borngrader |
| 10,084,321 B2 | 9/2018 | Von Novak, III et al. |
| 10,115,520 B2 | 10/2018 | Partovi |
| 2003/0174041 A1 | 9/2003 | Wienand |
| 2006/0034346 A1 | 2/2006 | Saio |
| 2007/0195066 A1 | 5/2007 | Bernitz |
| 2009/0101821 A1 | 4/2009 | Masafumi |
| 2009/0167432 A1 | 7/2009 | Van den Heuvel |
| 2009/0278523 A1* | 11/2009 | Yoda .................. H01F 38/14 |
| | | 323/318 |
| 2013/0181724 A1* | 7/2013 | Teggatz ................ H02J 7/025 |
| | | 324/629 |
| 2013/0193771 A1* | 8/2013 | Teggatz ................ H01F 38/14 |
| | | 307/104 |
| 2013/0241476 A1* | 9/2013 | Okada .................. G01N 21/94 |
| | | 320/108 |
| 2013/0259086 A1 | 10/2013 | Lane |
| 2014/0159501 A1* | 6/2014 | Kanno .................. H01F 38/14 |
| | | 307/104 |
| 2014/0183964 A1 | 7/2014 | Walley |
| 2015/0323694 A1* | 11/2015 | Roy ........................ H02J 17/00 |
| | | 307/104 |
| 2015/0331135 A1 | 11/2015 | Widmer et al. |
| 2015/0357828 A1 | 12/2015 | Ichikawa et al. |
| 2015/0364944 A1 | 12/2015 | Garcia Briz et al. |
| 2016/0064954 A1 | 3/2016 | Ibaragi |
| 2016/0134129 A1* | 5/2016 | Watanabe ............... H02M 1/32 |
| | | 307/104 |
| 2016/0254697 A1 | 9/2016 | Tanaka et al. |
| 2017/0338684 A1 | 11/2017 | Mishriki et al. |
| 2017/0338685 A1 | 11/2017 | Jung et al. |
| 2018/0054081 A1 | 2/2018 | Hwang |
| 2018/0109152 A1 | 4/2018 | Chen |
| 2018/0138758 A1 | 5/2018 | Jung et al. |
| 2018/0198323 A1* | 7/2018 | Widmer ................. B60L 11/182 |
| 2018/0205257 A1 | 7/2018 | Kwon et al. |
| 2018/0294673 A1 | 10/2018 | Bae |
| 2018/0301933 A1 | 10/2018 | Lee et al. |
| 2019/0081517 A1 | 3/2019 | Graham et al. |

\* cited by examiner

WIRELESS CHARGING SYSTEM WITH TEMPERATURE SENSOR ARRAY

This application claims priority to U.S. provisional patent application No. 62/726,124 filed Aug. 31, 2018, which is hereby incorporated by reference herein in its entirety.

FIELD

This relates generally to wireless systems, and, more particularly, to systems in which devices are wirelessly charged.

BACKGROUND

In a wireless charging system, a wireless power transmitting device such as a device with a charging surface wirelessly transmits power to another electronic device such as a battery-powered, portable electronic device. The portable electronic device receives the wirelessly transmitted power and uses this power to charge an internal battery and to power components in the portable electronic device.

It can be challenging to perform wireless charging operations in a wireless charging system. For example, it can be challenging to ensure that foreign objects such as coins that are present on a charging surface are not inadvertently heated during wireless charging operations.

SUMMARY

A wireless power transmitting device transmits wireless power signals to a wireless power receiving device. The wireless power receiving device has a rectifier and a wireless power receiving coil that receives wireless power signals.

In some embodiments, the wireless power transmitting device uses a layer of coils to transmit the wireless power signals. A dielectric layer in the wireless power transmitting device defines a charging surface that receives the wireless power receiving device. The dielectric layer overlaps the layer of coils.

In some embodiments, a layer of temperature sensors is interposed between the layer of coils and the dielectric layer. The temperature sensors may be configured to measure heat flux through the charging surface.

Control circuitry in the wireless power transmitting device uses the temperature information from the temperature sensors to determine whether a foreign object such as a coin is present on the charging surface. In response to detecting a foreign object, the control circuitry takes suitable action such as halting transmission of wireless power signals.

DETAILED DESCRIPTION

A wireless power system has a wireless power transmitting device that transmits power wirelessly to a wireless power receiving device. The wireless power transmitting device is a device such as a wireless charging mat, wireless charging puck, wireless charging stand, wireless charging table, or other wireless power transmitting equipment. The wireless power transmitting device has one or more coils that are used in transmitting wireless power to one or more wireless power receiving coils in the wireless power receiving device. The wireless power receiving device is a device such as a cellular telephone, watch, media player, tablet computer, pair of earbuds, remote control, laptop computer, other portable electronic device, or other wireless power receiving equipment.

During operation, the wireless power transmitting device supplies alternating-current drive signals to one or more wireless power transmitting coils. This causes the coils to transmit alternating-current electromagnetic signals (sometimes referred to as wireless power signals) to one or more corresponding wireless power receiving coils in the wireless power receiving device. Rectifier circuitry in the wireless power receiving device converts received wireless power signals into direct-current (DC) power for the wireless power receiving device.

A temperature sensor array is included in the wireless power transmitting device 12 to monitor for elevated temperatures on a charging surface of wireless power transmitting device 12. Temperature rises of large magnitude are generally undesired as they can be indicative of the presence of undesired foreign objects, such as coins, on the wireless power transmitting device that are intercepting power during wireless power transmission operations.

Figure 1:
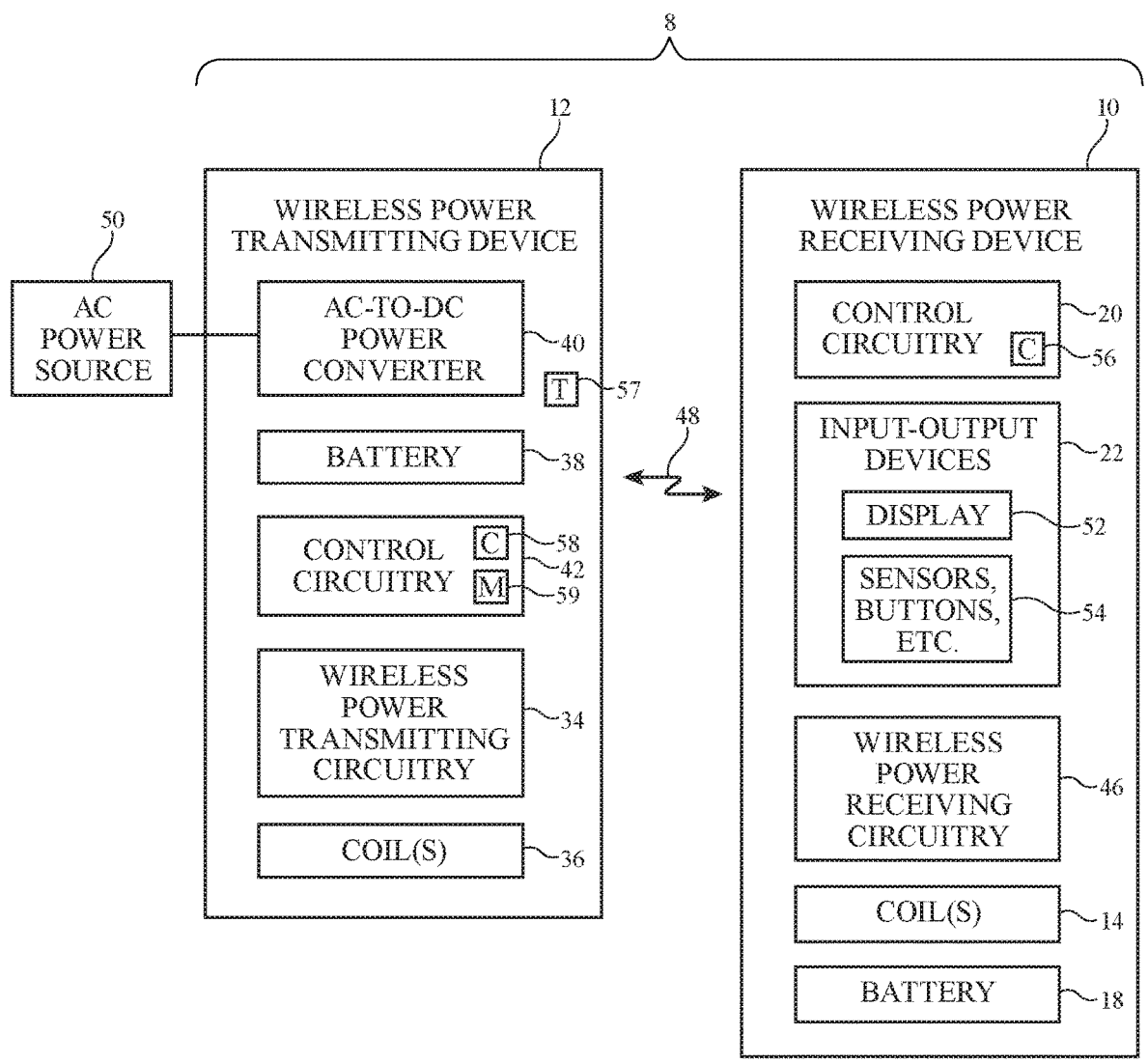
FIG. 1 is a schematic diagram of an illustrative wireless charging system in accordance with embodiments.

An illustrative wireless power system (wireless charging system) is shown in FIG. 1. As shown in FIG. 1, wireless power system 8 includes wireless power transmitting device 12 and one or more wireless power receiving devices such as wireless power receiving device 10. Device 12 may be a stand-alone device such as a wireless charging mat, may be built into furniture, or may be other wireless charging equipment. Device 10 is a portable electronic device such as a wristwatch, a cellular telephone, a tablet computer, or other electronic equipment. Illustrative configurations in which device 12 is a mat or other equipment that forms a wireless charging surface and in which device 10 is a portable electronic device that rests on the wireless charging surface during wireless power transfer operations are sometimes be described herein as examples.

During operation of system 8, a user places one or more devices 10 on the charging surface of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as alternating-current-to-direct current (AC-DC) power converter 40 can convert power from a mains power source or other alternating-current (AC) power source into direct-current (DC) power that is used to power control circuitry 42 and other circuitry in device 12. During operation, control circuitry 42 uses wireless power transmitting circuitry 34 and one or more coil(s) 36 coupled to circuitry 34 to transmit alternating-current electromagnetic signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC signals (drive signals) through coil(s) 36. As the AC signals pass through coil(s) 36, alternating-current electromagnetic fields (wireless power signals 48) are produced that are received by corresponding coil(s) 14 coupled to wireless power receiving circuitry 46 in receiving device 10. When the alternating-current electromagnetic fields are received by coil 14, corresponding alternating-current currents and voltages are induced in coil 14. Rectifier circuitry in circuitry 46 converts received AC signals (received alternating-current currents and voltages associated with wireless power signals) from coil(s) 14 into DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuits 56 for communicating wirelessly with corresponding wireless communications circuitry 58 in control circuitry 42 of wireless power transmitting device 12 and/or other equipment, audio components, and other components (e.g., input-output devices 22 and/or control circuitry 20) and are used in charging an internal battery in device 10 such as battery 18.

Wireless power transmitting device 12 includes communication means to establish communications with device 10. Such communications may include establishing that device 10 is an acceptable device to accept power, and handshaking establishing the desired rate of power transfer, and the actual power accepted by device 10. Wireless power transmitting device 12 includes measurement circuitry 59 that uses coils 36 and/or other circuitry to measure the characteristics of electronic devices and other object overlapping coils 36. As an example, measurement circuitry 59 may include impulse response measurement circuitry (sometimes referred to as inductance measurement circuitry and/or Q factor measurement circuitry) and/or other measurement circuitry coupled to coils 36 to make measurements of inductance L and quality factor Q for each of coils 36. During impulse response measurements, control circuitry 42 directs circuitry 59 to supply one or more excitation pulses (impulses) to each coil 36. The impulses may be, for example, square wave pulses of 1 μs in duration. Longer or shorter pulses may be applied, if desired. The resulting resonant response (ringing) of coil 36 and resonant circuitry in device 12 that includes coil 36 is then measured by circuitry 59 to determine L and Q. Using measurements such as these, control circuitry 42 can monitor one or more of coils 36 (e.g., each coil 36 in an array of coils 36 in device 12) for the presence of an external object such as one of devices 10 that is potentially compatible for wireless power transfer (sometimes referred to herein as a wireless power receiving device) or an incompatible object such as a coin or paperclip (sometimes referred to herein as a foreign object). Foreign objects are also detected based on temperature information such as temperature sensor measurements made using temperature sensors 57. In some embodiments, foreign objects are detected using temperature information or impedance information alone. In other embodiments, control circuitry 42 uses both temperature information and impedance information in detecting foreign objects.

Devices 12 and 10 include control circuitry 42 and 20. Control circuitry 42 and 20 includes storage and processing circuitry such as microprocessors, power management units, baseband processors, digital signal processors, microcontrollers, and/or application-specific integrated circuits with processing circuits. Control circuitry 42 and 20 is configured to execute instructions for implementing desired control and communications features in system 8. For example, control circuitry 42 and/or 20 may be used in determining power transmission levels, processing sensor data such as temperature sensor data, processing user input, processing information from receiving circuitry 46, using information from circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions. Control circuitry 42 and 20 may be configured to support wireless communications between devices 12 and 10 (e.g., control circuitry 20 may include wireless communications circuitry such as circuitry 56 and control circuitry 42 may include wireless communications circuitry such as circuitry 58). Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly during operation of system 8. Devices 10 and 12 may, for example, have wireless transceiver circuitry in control circuitry 42 and 20 (see, e.g., wireless communications circuitry such as circuitry 58 and 56 of FIG. 1) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). In some embodiments, devices 12 and 10 may communicate the amount of power transmitted and the amount of power received, and the presence of other losses, termed power counting (PC). Other losses may include eddy currents in a case or other acceptable power losses, or they may include losses due to foreign object heating.

Figure 2:
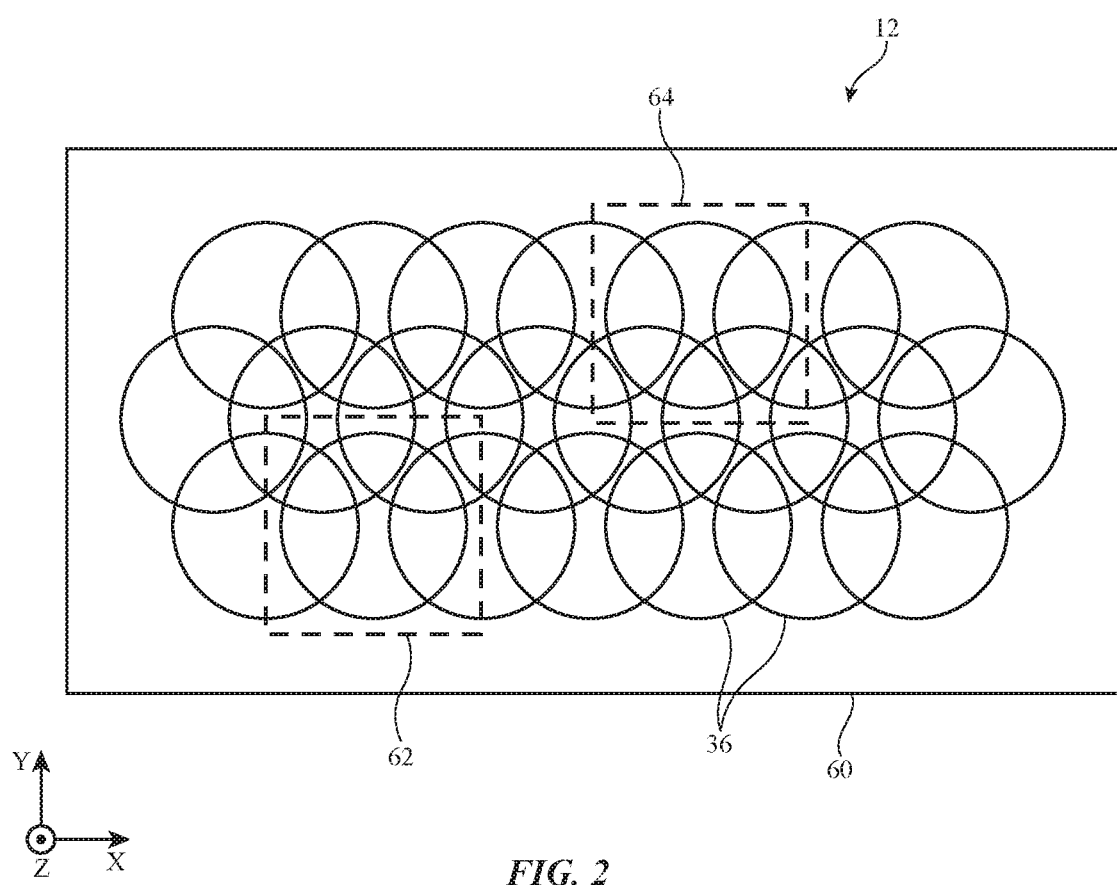
FIG. 2 is a top view of an illustrative wireless power transmitting device with an array of coils that forms a wireless charging surface in accordance with an embodiment.

With one illustrative configuration, wireless transmitting device 12 is a wireless charging mat or other wireless power transmitting equipment that has an array of coils 36 that supply wireless power over a wireless charging surface. This type of arrangement is shown in FIG. 2. In the example of FIG. 2, device 12 has an array of coils 36 that lie in parallel X-Y planes. Coils 36 of device 12 are covered by a planar dielectric layer. The outermost surface of the dielectric layer forms charging surface 60. The lateral dimensions (X and Y dimensions) of the array of coils 36 in device 12 may be 1-1000 cm, 5-50 cm, more than 5 cm, more than 20 cm, less than 200 cm, less than 75 cm, or other suitable size. Coils 36 may overlap or may be arranged in a non-overlapping configuration. Coils 36 can be placed in a rectangular array having rows and columns and/or may be tiled using a hexagonal tile pattern or other pattern.

As shown in the example of FIG. 2, external objects such as external object 62 and object 64 may overlap one or more coils 36. In some situations, objects 62 and 64 will be portable electronic devices 10. In other situations, one or more of objects 62 and 64 will be incompatible external objects (e.g., foreign objects such as metallic coins or other conductive objects). Situations may also arise in which foreign objects and wireless power receiving devices overlap the same coil or coils 36. During operation, system 8 automatically detects whether objects located on surface 60 correspond to wireless power receiving devices 10, to which wireless power should be provided, or foreign objects, to which wireless power should not be provided. In an illustrative embodiment, impedance monitoring circuitry in measurement circuitry 59 and/or temperature measurement circuitry such as temperature sensors 57 is used in detecting when foreign objects are present and/or when undesired heating of foreign objects is taking place. Upon detection of a foreign object, system 8 automatically takes suitable action such as reducing and/or interrupting wireless power transmission.

Figure 3:
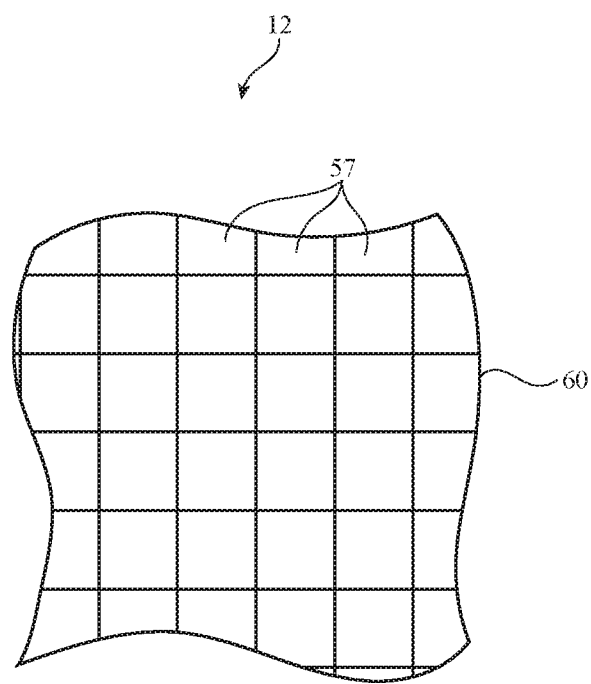
FIG. 3 is a top view of a portion of an illustrative temperature sensor array extending across the wireless charging surface in accordance with an embodiment.

When wireless power from coils 36 is being transmitted, currents may be induced in foreign objects on charging surface 60 that cause these objects to heat. To monitor for undesired temperature rises of the type associated with heating of foreign objects on charging surface 60, temperature sensors 57 may be formed in an array across charging surface 60, as shown in FIG. 3. Temperature sensors 57 can be arranged in an array having N rows and M columns (e.g., where N and/or M are at least 1, at least 2, at least 5, at least 10, at least 20, at least 35, at least 60, at least 100, at least 200, at least 400, fewer than 1000, fewer than 450, fewer than 210, fewer than 125, fewer than 70, fewer than 50, fewer than 40, or other suitable values. Temperature sensors may be organized in a rectangle with rounded corners or other suitable shape (e.g., a shape that matches the outline of charging surface 60). Temperature sensors 57 are overlapped by the layer of dielectric on the top of wireless power transmitting device 12 that forms charging surface 60 and are interposed between coils 36 and the layer of dielectric.

Figure 4:
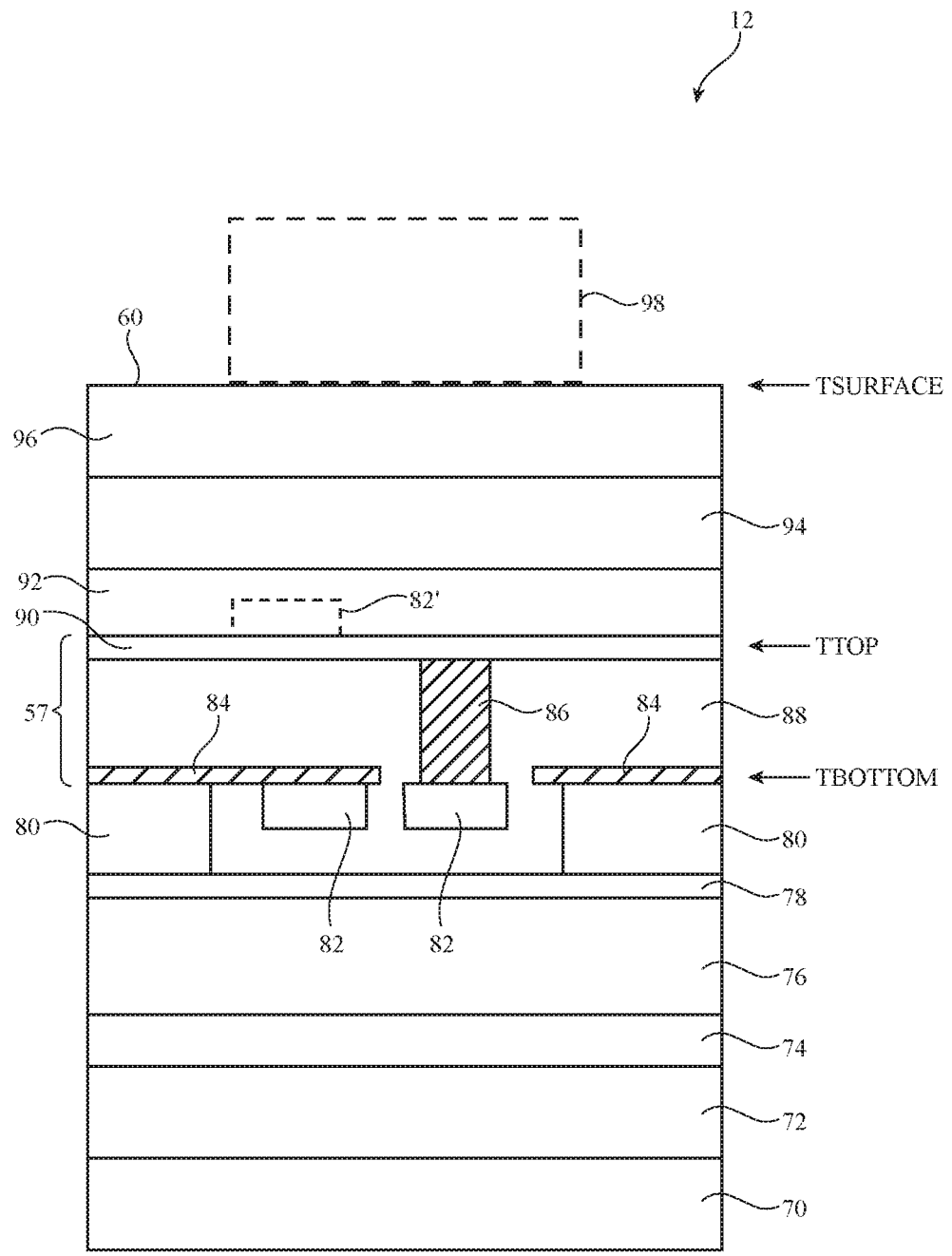
FIG. 4 is a cross-sectional side view of an illustrative wireless power transmitting device in accordance with an embodiment.

A cross-sectional side view of wireless power transmitting device 12 is shown in FIG. 4. As shown in FIG. 4, device 12 has a housing such as housing 70. In some embodiments, wireless power transmission is not expected to occur through housing 70 and housing 70 is formed from metallic materials. In some embodiments, housing 70 is formed from metal, polymer, glass, or other materials.

Printed circuit 72 is placed above housing 70. Printed circuit 72 includes integrated circuits (e.g., control circuitry 42), temperature sensors (e.g., sensors that measure changes in resistance of a material with changes in temperature), and other circuitry for device 12 (e.g., integrated circuits, signal paths, etc.). Temperature sensors in printed circuit 72 are used during calibration operations for temperature sensors 57.

Magnetic shielding layer 74 is formed above printed circuit 72 and is configured to shield circuitry in printed circuit 72 from magnetic fields from coils 36. Magnetic shielding layer 74 is formed using a layer of ferrite or other magnetic material.

Coils 36 are placed in one or more coil layers 76.

Electronic shielding layer 78 is formed above coil layer 76 and includes a conductive layer for electrically isolating coils 36 from the circuitry in the upper layers of device 12.

An array of temperature sensors 57 is formed in a layer between shielding layer 78 and adhesive layer 92 and include, in some embodiments, upper temperature sensor pads such as upper temperature sensor pads 90 and lower temperature sensor pads such as lower temperature sensor pads 84. There may be different numbers of pads 90 and pads 84 or the number of pads 90 and 84 may be equal. Arrangements in which the numbers of pads 90 and 84 are equal are sometimes described herein as an example. Adhesive layer 92, a polymer layer such as polycarbonate layer 94, and an elastomeric polymer layer such as silicone layer 96 and/or other layers of dielectric material form a dielectric layer at the top of device 12 that overlap sensors 57. The outermost surface of this dielectric layer (e.g., the top surface of layer 96) defines charging surface 60.

During normal charging operations, wireless power receiving device 10 rests in location 98 on charging surface 60. In some situations, however, a foreign object such as a coin or paperclip may be present in location 98 and may be heated by the wireless power signals emitted by coils 36. Temperature sensors 57 are used by control circuitry 42 to detect undesired heating. When undesired heating is detected, control circuitry 42 takes appropriate action such as halting wireless power transmission with coils 36, thereby prevent foreign objects on charging surface 60 from becoming overly warm.

In some embodiments, such as the illustrative arrangement of FIG. 4, temperature sensors 57 have temperature sensing devices that are configured to measure heat flux through charging surface 60. Sensors 57 may, for example, include a first set of temperature sensing devices that is separated from charging surface 60 by a first thermal resistance and a second set of temperature sensing devices that is separated from charging surface 60 by a second thermal resistance that is greater than the first thermal resistance. In this type of arrangement, the first temperature sensing devices may react relatively quickly to changes at charging surface 60 while the second temperature sensing devices may react more slowly and may therefore be considered as reference temperature sensing devices (e.g., temperature sensing devices that measure the ambient temperature for device 12). Differential measurements using data from the first and second sets of temperature sensing devices allow heat flux through charging surface 60 to be estimated.

The temperature sensing devices that are used in temperature sensors 57 may be based on thermistors (e.g., resistive temperature sensing devices of the type that are sometimes based on temperature sensitive ceramics or metal oxides), resistance thermometers (e.g., resistive temperature sensing devices of the type that are sometimes formed from metal temperature sensing elements such as elements formed from platinum, nickel, or other metals and which may, if desired, be formed from thin-film resistors), thermocouples, semiconductor temperature sensing devices, or other temperature sensor components.

Figure 5:
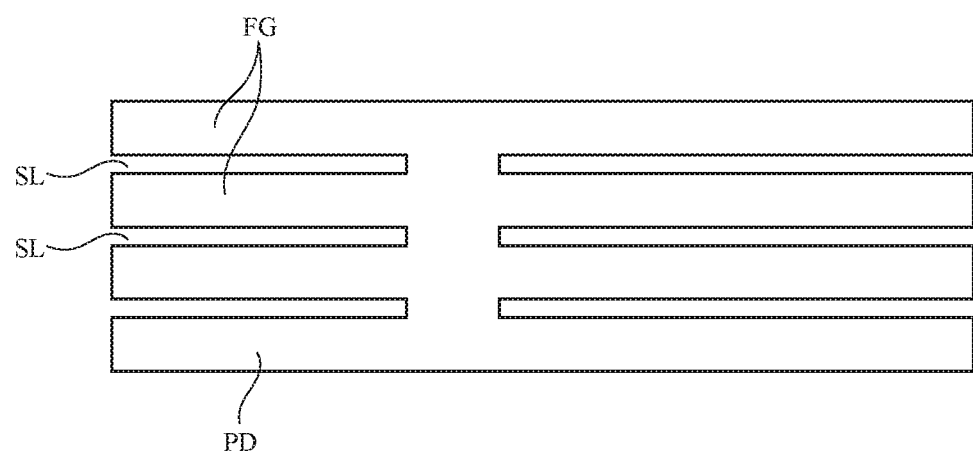
FIG. 5 is a top view of an illustrative temperature sensor pad formed from a metal trace with fingers separated by slots in accordance with an embodiment.

In the example of FIG. 4, temperature sensors 57 include temperature sensing devices with temperature sensor components 82 (e.g., thermistors, resistance thermometers, etc.) and associated metal pads that are thermally coupled to the temperature sensor components. In each temperature sensor 57, for example, a first temperature sensing device may include a first temperature sensor component 82 that is thermally coupled to a lower metal trace forming lower temperature sensor pad 84 and a second temperature sensor component 82 that is thermally coupled to an upper metal trace forming upper temperature sensor pad 90 using metal via 86. This allows the first temperature sensing device to measure temperature at lower temperature sensor pad 84 and allows the second temperature sensing device to measure temperature at upper temperature sensor pad 90. If desired, the second temperature sensor component can be coupled directly to upper temperature sensor pad 90 (see, e.g., illustrative temperature sensor component 82'). Pads 84 and 90 are supported on opposing upper and lower surfaces of a dielectric layer such as printed circuit substrate 88. Adhesive 80 is used in attaching printed circuit substrate 88 to layer 78. Air surrounds temperature sensor components 82. Pads 84 and/or 90 may have any suitable shapes (rectangular, hexagonal, square, circular, shapes with straight and/or curved edges, triangular, etc.). With one illustrative configuration, pads 84 and 90 have elongated fingers separated by interposed slots as shown by illustrative pad PD of FIG. 5. The presence of slots SL between fingers FG in pad PD helps prevent eddy currents and undesired heating of the temperature sensor pads during transmission of electromagnetic signals from coils 36. Any remaining heating of the temperature sensor pads due to wireless power signal transmission is taken into account by control circuitry 42 (e.g., by calibrating temperature information to correct temperature readings for the impact of wireless power signals on the temperature of the pads).

Because temperature sensing pads 90 are closer to surface 60 than pads 84, the structures between pads 90 and surface 60 have less thermal resistance than the structures between pads 84 and surface 60. This allows differential temperature measurements (temperature gradient measurements) and therefore measurements of heat flux through surface 60 to be made. The temperature sensing devices of FIG. 4 use temperature sensing pads (metal pads), but some or all of these pads may be omitted and/or other structures may be used to allow temperature sensors 57 to make heat flux measurements. Moreover, the number of pads associated with the lower thermal resistance sensing devices (pads 90) need not be the same as the number of pads associated with the higher thermal resistance sensing devices (pads 84). There may be, for example, fewer pads 84 than pads 90.

During operation of device 12, coils 36 produce wireless power signals that are transmitted to device 10. In some situations, foreign objects such as coins are present on charging surface 60. To determine whether charging has caused a temperature rise in a coin or other foreign object on charging surface 60, control circuitry 42 gathers temperature information using temperature sensors 57.

As shown in FIG. 4, charging surface 60 is characterized by a temperature Tsurface. Upper temperature sensor pads 90 in the layer of metal traces formed between adhesive layer 92 and temperature sensor printed circuit substrate 88 are characterized by a temperature Ttop and lower temperature sensor pads 90 in the layer of metal traces formed between adhesive 80 and substrate 88 are characterized by a temperature Tbottom. During operation, control circuitry 42 uses temperature information such as information on the known or computed values of Tsurface, Ttop, and/or Tbottom and/or other information from temperature sensors 57 in determining whether a foreign object is present on charging surface 60 (e.g., by determining whether heat flux through surface 60 is greater than a predetermined threshold amount, by determining whether measured temperatures are too high, and/or by otherwise processing temperature data).

Figure 6:
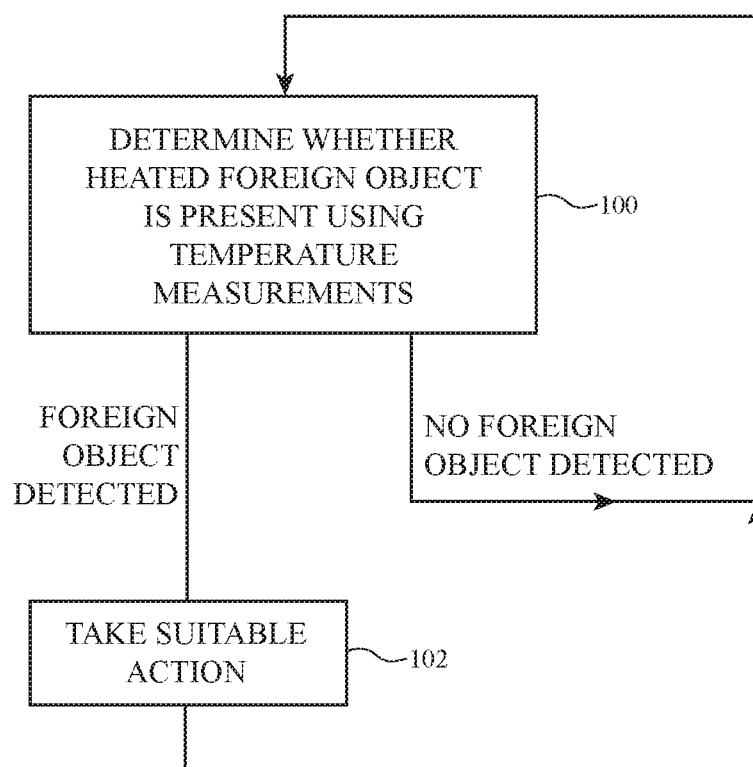
FIG. 6 is a flow chart of illustrative operations involved in using temperature sensors to detect foreign objects in accordance with an embodiment.

A flow chart of illustrative operations involved in using temperature information during operation of device 12 is shown in FIG. 6. During the operations of block 100, during and/or after coils 36 are used in transmitting wireless power, control circuitry 42 gathers information from the array of temperature sensors 57 in device 12. In particular, temperature sensor components 82 are used in measuring the temperatures Ttop and Tbottom for each of the temperature sensors 57 in the temperature sensor array and data processing operations are used to analyze this temperature information to determine whether a heated foreign object is present on surface 60. If no foreign object is detected, device 12 can continue to transmit wireless power to device 10 and control circuitry 42 can continue to use sensors 57 to make temperature measurements. In response to detection of a foreign object on surface 60 (e.g., because a temperature exceeds a predetermined threshold value), suitable action is taken by control circuitry 42 during the operations of block 102. Examples of actions that may be taken at block 102 include halting wireless power transmission, reducing the amount of power being wirelessly transmitted, turning off a subset of one or more coils 36 (e.g. one or more coils overlapped by a detected foreign object) so that wireless power transmission is halted for that subset of coils, issuing alerts (e.g., using output devices in device 12 to issue visual and/or audio warnings indicating to a user that a foreign object is present on charging surface 60), and/or wirelessly transmitting alert messages to device 10 or other devices. If appropriate, operations may then loop back to block 100.

Any suitable processing techniques may be used during block 100 to convert temperature measurements into information on whether a foreign object is present on surface 60. In some embodiments, device 12 may communicate with device 10 to establish temperatures or power consumption by subsystems. If a surface temperature estimate is not adequately accounted for by device 10 or other charging devices, charging may be interrupted. If a rate of estimated temperature rise is not adequately accounted for by device 10, charging may be interrupted. In some embodiments, if the estimated surface temperature is rising before wireless power transfer coils have been activated, device 12 may wait for temperatures to stabilize before charging commences. In some embodiments, if charging has been interrupted by a thermal event, device 12 may wait for an electromagnetic change before attempting to re-start power transfer.

Figure 7:
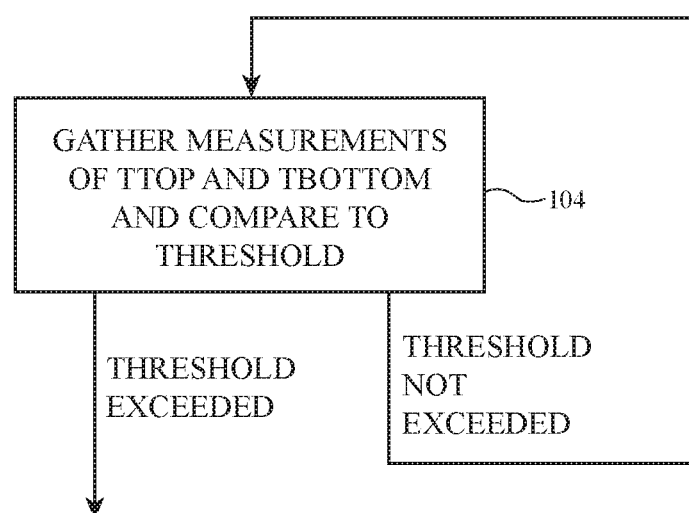
FIG. 7 is a flow chart of illustrative operations involved in determining whether a foreign object is present by comparing temperature measurements to a threshold in accordance with an embodiment.

With one illustrative arrangement, which is shown in the flow chart of FIG. 7, control circuitry 42 of device 12 gathers measurements of Ttop and Tbottom from upper and lower temperature sensor pads in each temperature sensor 57 of the array of temperature sensors and compares these temperature measurements to a predetermined threshold during the operations of block 104. If any of the Ttop or Tbottom values exceeds the predetermined temperature threshold, suitable action is taken by device 12 at block 102 of FIG. 6. Operations may otherwise continue at block 104 while wireless power is transmitted by coils 36.

Figure 8:
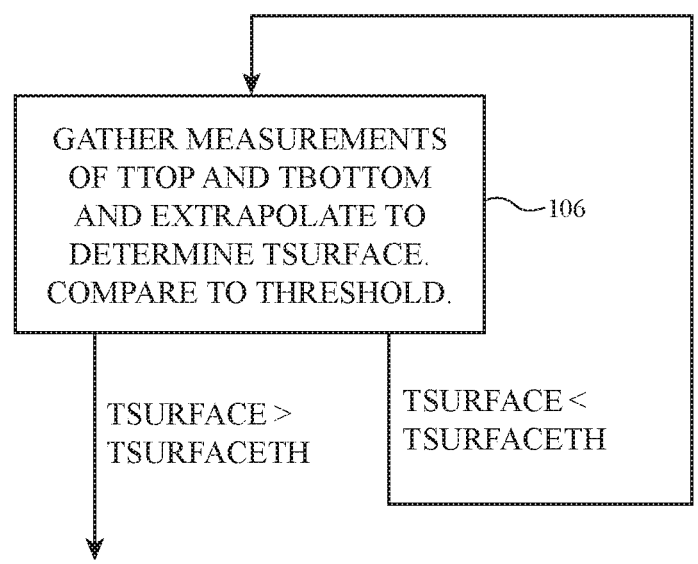
FIG. 8 is a flow chart of illustrative operations involved in determining whether a foreign object is present by comparing charging surface temperatures extrapolated from temperature measurements in a layer of temperature sensors to a threshold in accordance with an embodiment.

With another illustrative arrangement, which is shown in the flow chart of FIG. 8, control circuitry 42 uses the array of temperature sensors 57 to gather measurements of Ttop and Tbottom. For each temperature sensor, the value of Tsurface can then be estimated using equation 1, where the value of constant k is determined from previous calibration measurements made on device 12 or calculated from the material properties and design of device 12.

$$T\text{surface} = T\text{top} + k(T\text{top} - T\text{bottom}) \quad (1)$$

Once the value of Tsurface has been extrapolated for each temperature sensor 57 in the array of temperature sensors covering surface 60, control circuitry 42 compares each extrapolated value of Tsurface to a predetermined surface temperature threshold Tsurfaceth. In response to determining that any of the extrapolated values of Tsurface exceed Tsurfaceth, suitable action is taken at block 102 of FIG. 6.

Figure 9:
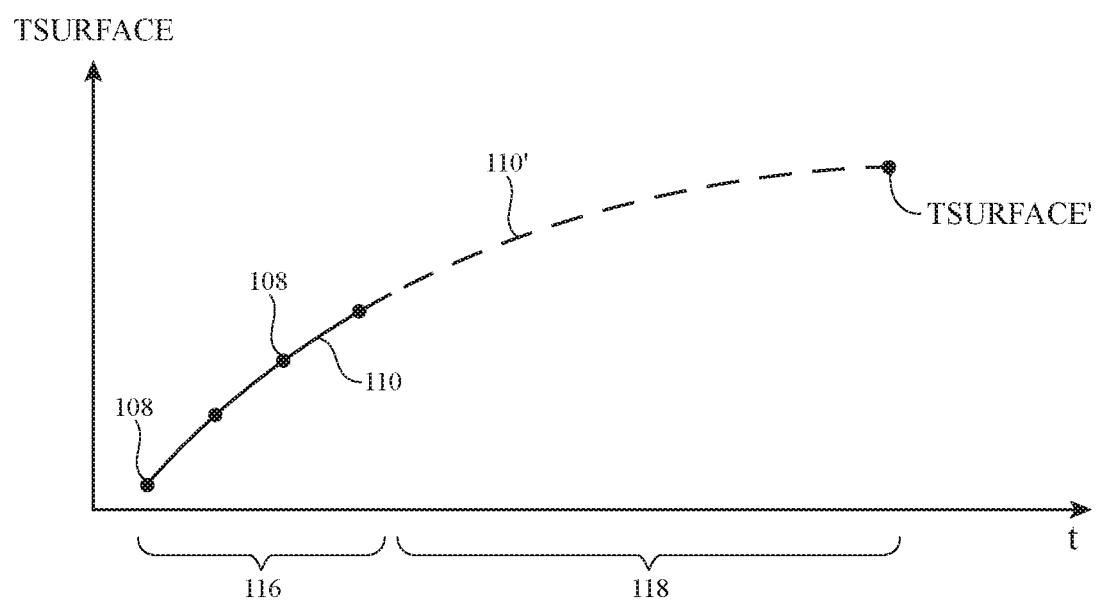
FIG. 9 is a graph showing how an illustrative time-dependent temperature rise curve can be fit to a series of temperature measurements to predict a future surface temperature in accordance with an embodiment.

FIG. 9 is a graph showing how Tsurface is predicted at a time in the future by measuring temperature rise as a function of time using temperature sensors 57. During calibration operations, the expected rise in temperature Tsurface is measured in different operation conditions. A family of temperature rise curves is then identified that characterizes surface temperature Tsurface as a function of different heating conditions. During operation, temperature measurements (e.g., extrapolated Tsurface values) are measured for a period of time using sensors 57. In the example of FIG. 9, four measurements 108 of Tsurface have been made during time period 116. Time period 116 may be, for example, 5 seconds or other suitable amount of time. By fitting a time-dependent surface temperature rise curve such as curve 110 to measurements 108 and by extending the curve that has been fit over future time period 108 (e.g., 15 seconds) as shown by curve portion 110', a predicted future surface temperature Tsurface' is determined.

Figure 10:
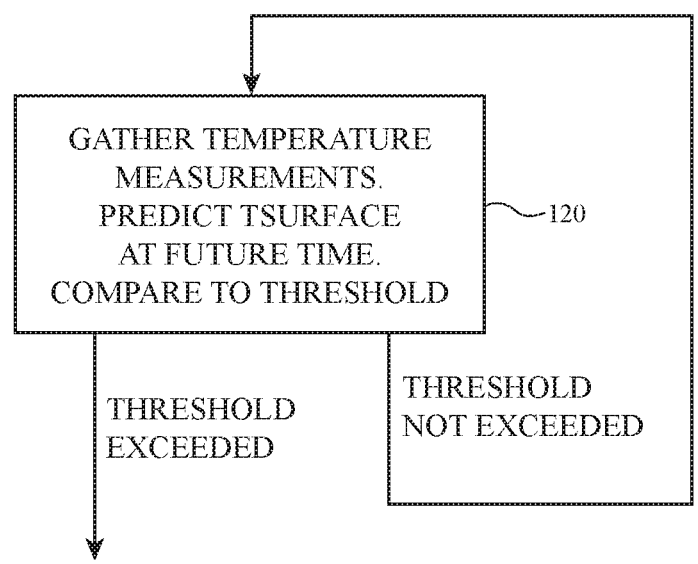
FIG. 10 is a flow chart of illustrative operations involved in determining whether a foreign object is present by comparing predicted future temperature to a threshold in accordance with an embodiment.

Illustrative operations involved in using this type of surface temperature prediction technique are shown in FIG. 10. During the operations of block 120, control circuitry 42 gathers temperature measurements Ttop and Tbottom from the sensors 57 in the array of sensors overlapping charging surface 60. Temperature measurements are gathered for a first time period (e.g., period 116 of FIG. 9). Using the curve-fitting arrangement of FIG. 9, control circuitry 42 predicts future temperature Tsurface' on charging surface 60 at the completion of a second time period (e.g., time period 118 of FIG. 9, which may be longer than period 116). Predicted surface temperature values Tsurface' across charging surface 60 are then compared to a predetermined threshold temperature. If any of the predicted surface temperatures exceed the threshold, suitable action is taken at block 102 of FIG. 6. In some embodiments, a set of patterns or curves from devices 10 under a variety of conditions is pre-processed, along with the corresponding differential temperatures, rates of change of differential temperatures, and rates of change of temperatures. The control circuitry of device 10 compares the current sensor information with the pre-processed patterns or curves, and interrupts charging if the sensor information is sufficiently different from acceptable patterns.

If desired, transfer function techniques may be used in characterizing the thermal behavior of external objects on charging surface 60.

Figure 11:
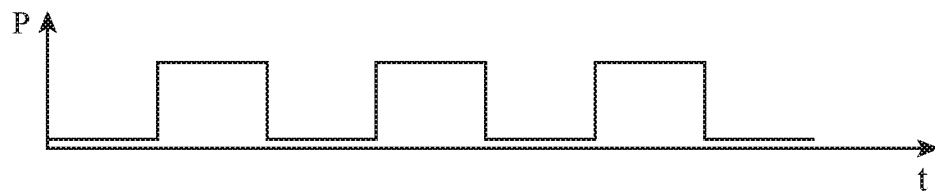
FIG. 11 is a graph of an illustrative coil power versus time characteristic of the type that may be obtained when control circuitry in a wireless power transmitting device is performing amplitude modulation on wireless power signals in accordance with an embodiment.
Figure 12:
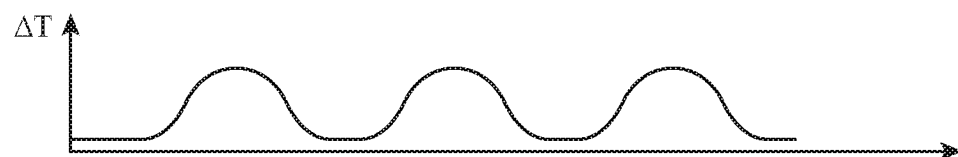
FIG. 12 is a graph of an illustrative temperature differential across two layers of sensors as a function of time that is associated with the coil power versus time characteristic of FIG. 11 in accordance with an embodiment.
Figure 13:
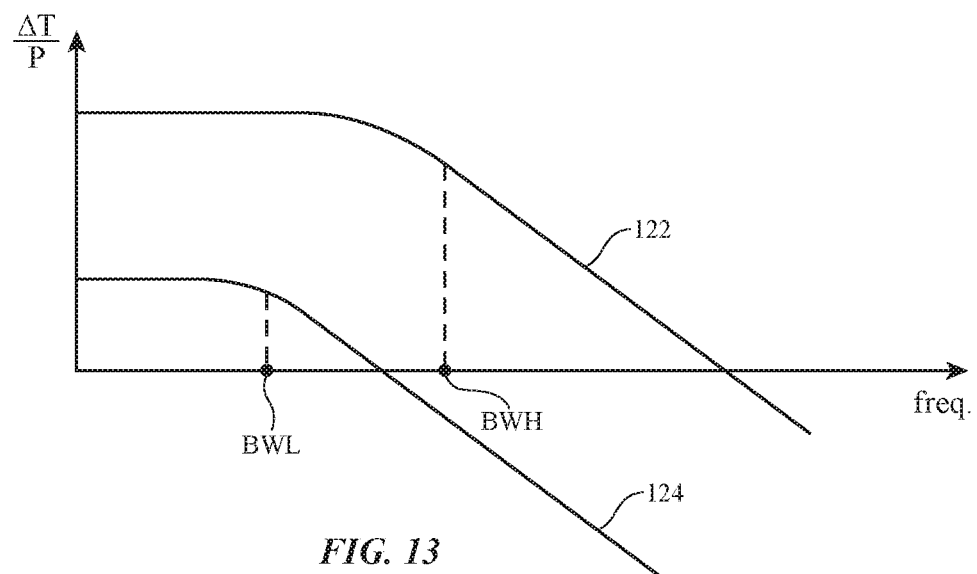
FIG. 13 is a graph in which illustrative transfer functions associated with the coil power and temperature differential measurements of FIGS. 11 and 12 are plotted in accordance with an embodiment.

Consider, as an example, the illustrative approach of FIGS. 11, 12, and 13. As shown in FIG. 11, the amount of power P that that is transmitted from coils 36 may be modulated (e.g., amplitude modulated) as a function of time by control circuitry 42. As shown in FIG. 12, this causes a corresponding time-varying response in the measured temperature differential ΔT (e.g., a temperature differential ΔT that is equal to Ttop-Tbottom and that is proportional to the heat flux flowing through the temperature sensor layer). Control circuitry 42 modulates power P using different frequencies so that a transfer function ΔT/P can be characterized.

Wireless power receiving device 12 may not be receiving wireless power signals that are produced by coils 36 during the amplitude modulation process. The modulation function used for power P in the example of FIG. 11 is a square wave, but other types of time-varying power characteristics may be used to modulate wirelessly transmitted power P, if desired.

A transfer function (ΔT/P) is associated with the first and second temperatures measured using the temperature sensors (e.g., temperature differential ΔT for each temperature sensor 57) and the amplitude modulated wireless power signals. As shown in FIG. 13, corresponding transfer function curves (ΔT/P in log scale) can be plotted as a function of modulation frequency and the bandwidth (e.g., the 3 dB bandwidth or other transfer function bandwidth) of each of these curves can be determined and compared to a threshold value to determine whether a foreign object is present.

In the example of FIG. 13, transfer function 124 corresponds to a larger object such as a wireless power receiving device 10 and is characterized by a transfer function bandwidth BWL that is less than a predetermined threshold value and transfer function 122 corresponds to a smaller object such as a coin or other foreign object and is characterized by a transfer function bandwidth BWH that exceeds the predetermined threshold value. If desired, transfer function techniques such as these may be used during wireless power transmission. For example, the transfer function can be obtained by device 12 as wireless power signals are being received by wireless power receiving device 10 (e.g., by determining the transfer function during normal charging operations by measuring the coil current for coils 36 while charging device 12 without pulsing the wireless power signals).

Figure 14:
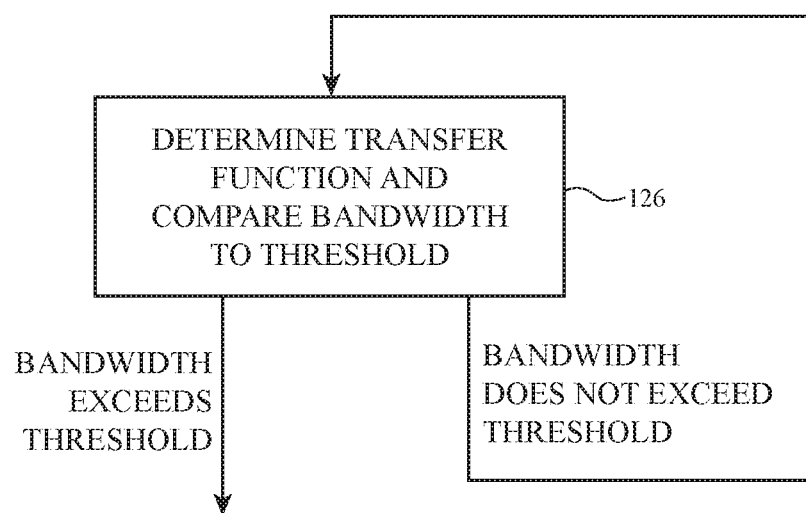
FIG. 14 is a flow chart of illustrative operations involved in determining whether a foreign object is present using transfer function information in accordance with an embodiment.

Illustrative operations associated with using transfer function techniques to detect foreign objects are shown in the flow chart of FIG. 14. As shown in FIG. 14, control circuitry 42 determines the transfer function associated with the temperature information (e.g., ΔT) gathered by temperature sensors 57 and the wireless power signals produced by coils 36 (during amplitude modulation of the wireless power signals while device 12 is not being charged or during normal charging of device 12) during the operations of block 126. Control circuitry 42 then computes the transfer function bandwidth of the transfer function. The transfer function bandwidth is compared to a predetermined transfer function bandwidth threshold. In response to determining that the transfer function bandwidth exceeds the predetermined transfer function bandwidth, control circuitry 42 concludes that a foreign object is present on charging surface 60 and suitable action is taken at block 102 of FIG. 6.

Figure 15:
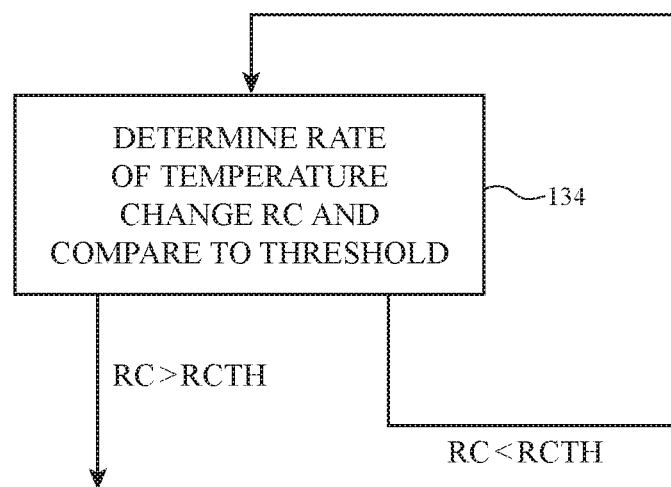
FIG. 15 is a flow chart of illustrative operations involved in determining whether a foreign object is present by comparing measured rates of temperature change to a threshold in accordance with an embodiment.

If desired, control circuitry 42 can determine whether a foreign object is present on surface 60 by measuring the rate of change in the temperature measured using sensors 57. This type of approach is illustrated in the flow chart of FIG. 15. During the operations of block 134, control circuitry 42 gathers temperature measurements (e.g., Ttop and/or Tbottom) using temperature sensors 57. A series of two or more measurements are gathered over a period of time so that the rate of change RC of temperature Ttop and/or the rate of change of temperature Tbottom are determined. The rate of temperature change RC is then compared to a predetermined threshold value RCTH. If the rate of change is greater than the threshold, a foreign object is considered to be present and suitable action is taken at block 102 of FIG. 6. In another example, control circuitry 42 can determine whether a foreign object is present on surface 60 by measuring the rate of change in the temperature differences measured using sensors 57. During the operations of block 134, control circuitry 42 gathers temperature measurements (e.g., Ttop and/or Tbottom) using temperature sensors 57. A series of two or more measurements are gathered over a period of time to determine the rate of change of the difference between the temperature Ttop and the temperature Tbottom. The rate of differential temperature change is then compared to a predetermined threshold value. If the rate of change is greater than the threshold, a foreign object is considered to be present and suitable action is taken at block 102 of FIG. 6. In a further example, a linear combination of the rate of change of a differential temperature of two sensors is combined with the rate of change of the absolute temperature of other sensors, and the result is compared to a predetermined threshold, and if the threshold is exceeded, a suitable action is taken (e.g., charging is interrupted).

Figure 16:
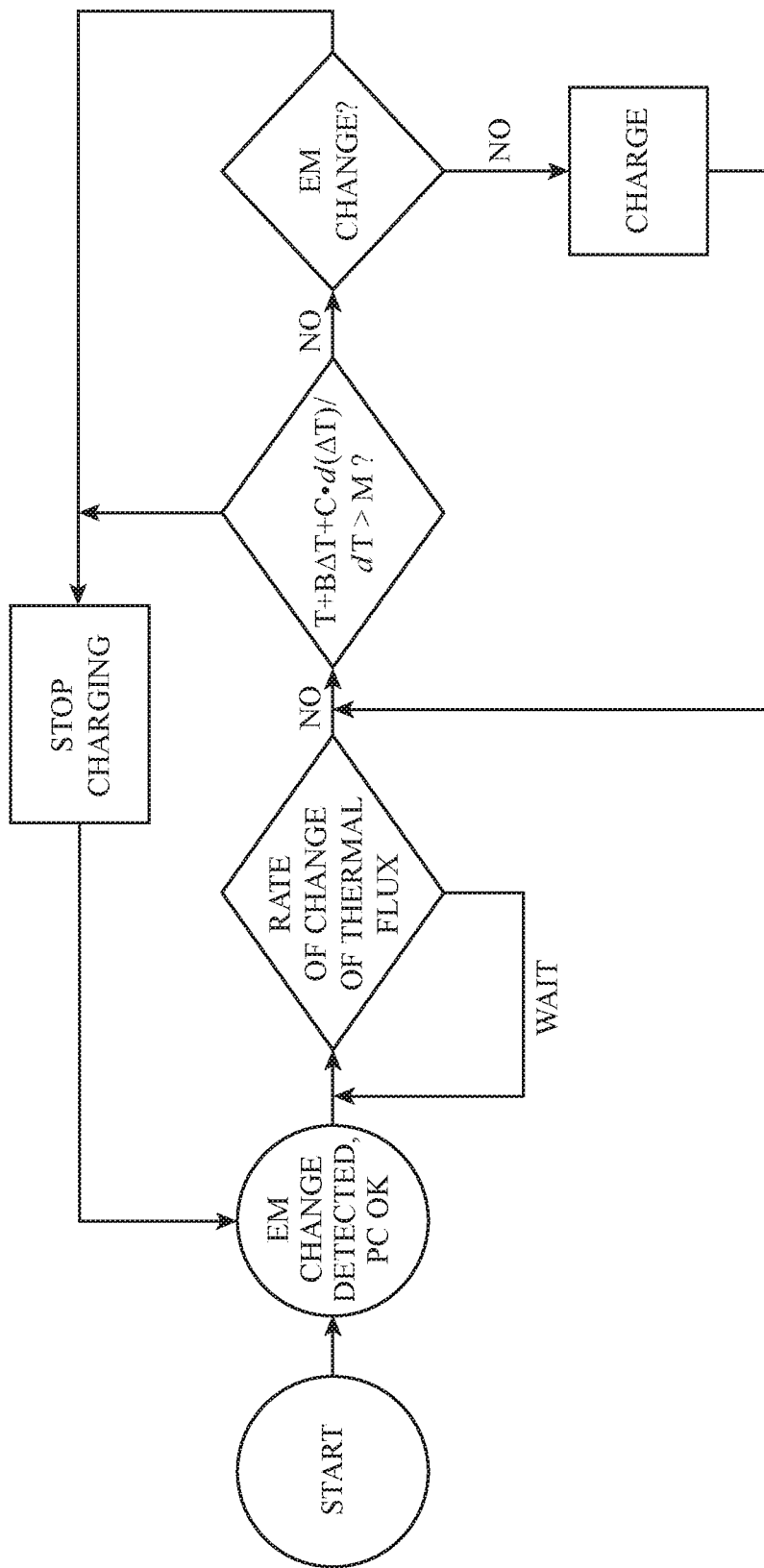
FIG. 16 is a flow chart of illustrative operations involved in using a wireless power transmitting device in accordance with an embodiment.

FIG. 16 shows an example using Power Counting (PC), changes in coil inductance, and changes in mutual inductance, as a means of avoiding excessive heating of incidental, undesired foreign objects. When power is supplied to the charge pad 12, and the charge pad is active, coil modulation pulses are used to scan for appropriate devices 10, and device 10 responds by modulating the load on its receive coil 14. Whenever a change is detected in the number or placement of devices 10 on wireless power transmitting device 12, and at least one device 10 requests wireless power, a series of temperature scans of the thermal measurement array are conducted. Changes such as these that trigger subsequent temperature scans can be detected using electromagnetic (EM) measurements (e.g., by evaluating a pattern of coil currents induced by coil modulation pulses). Alternatively and/or in combination with using electromagnetic measurements, power tracking and power counting techniques may be used by system 8 to detect changes on transmitting device 12 that trigger thermal measurements.

With an illustrative power tracking embodiment, following a satisfactory thermal scan with temperature sensors 57, system 8 is placed in known states (baseline power tracking states) at regular intervals (e.g., by control circuitry 42 and/or 20) and the efficiency of wireless power transfer between device 12 and devices 10 is recorded and tracked during these baseline power tracking periods. This establishes a set of baseline efficiencies. If desired, closed loop power transfer operations may be paused during the baseline power tracking states. In response to detection of sufficient changes in the power transfer efficiency values during a baseline power tracking state from those that have been previously recorded (e.g., detected changes in efficiency that exceed a predetermined threshold amount, etc.) new thermal measurements by the temperature sensors 57 can be triggered.

With an illustrative power counting technique, dynamic modeling may be used to detect triggering events. Temperature sensors 57 are periodically scanned to search for excessive temperatures. Following each satisfactory scan, system 8 is placed in a known state and a baseline model-building operation (closed or open loop) is performed. During model building operations, control circuitry in system 8 builds a power counting regression model to predict power losses. After the model is built, the control circuitry continuously uses the model to predict losses (e.g., using a power counting scheme). If measured losses are detected that are higher than the losses predicted by the model (e.g., if losses measured by power counting exceed losses predicted by the power counting model by more than a predetermined threshold amount), a new thermal measurement using sensors 57 may be triggered. If desired, closed loop power transfer operations may be performed both while model building and while using the model to predict losses.

In general, any suitable technique may be used to trigger additional thermal measurements using temperature sensors 57. The foregoing examples such as impedance change detection using electromagnetic measurements and measurement of thermal changes using sensors 57 (e.g., power tracking, power counting using a regression model, etc.) are illustrative.

In an embodiment, while the temperatures measured by the thermal array formed from temperature sensors 57 are above a threshold, the transmitting device 12 continues to monitor the communications and the temperatures of sensors 57. When the temperatures are no longer rising at a rate above the threshold, a power counting algorithm is used to estimate the power efficiency of the configuration. If the estimated, projected charging efficiency is above a threshold for some combination of coils, power transmission is started at a rate RO. The temperature of sensors 57 in the array covering charging surface 60 are monitored. For each pair of sensors top and bottom, the following calculation is performed: Tave+B$\Delta$T+Cd($\Delta$T)/dt>M, where Tave is the average temperature of the top and bottom sensors, ($\Delta$T) is the difference temperature between the top and bottom sensors of each pair, d($\Delta$T)/dt is the rate of change of the temperature difference ($\Delta$T), and B, C and M are suitably chosen constants determined by measurements of a number of similar charging devices 10. If the inequality is true, charging is interrupted, and the device 12 waits for a change in power counting, mutual inductance, or self inductance. If the inequality is false, and there is no electromagnetic change, charging is started or continues and a further set of temperature measurements are made. The cycle of temperature measurements, electromagnetic monitoring, and charging continues as long as the thermal test passes, and the device 10 continues to request charging power.

Figure 17:
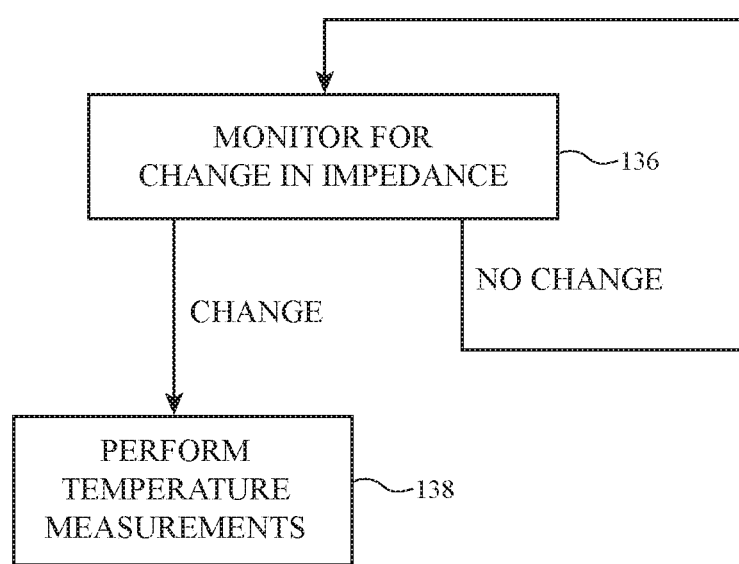
FIG. 17 is a flow chart of illustrative operations involved analyzing impedance measurements to determine whether temperature measurements for detecting a foreign object should be made by in accordance with an embodiment.

FIG. 17 shows how coil impedance change measurements can be used in determining whether a foreign object is present. During the operations of block 136, control circuitry 42 uses impedance measurement circuitry 59 to measure the impedance (e.g., the inductance) associated with each coil 36. If a change is measured in the impedance of any coil 36 (e.g., if a newly measured impedance value differs from a previous impedance value by more than a threshold amount), control circuitry 42 can conclude that there is an elevated likelihood that a foreign object is present on charging surface 60. Accordingly, control circuitry 42 performs temperature-based foreign object detection measurements and analysis during the operations of block 138 (e.g. using arrangements of the type described in connections with FIGS. 7-15). By performing temperature measurements only when presence of a foreign object is suspected due to a measured change in coil impedance, the number of temperature measurements performed by device 12 is reduced. The operations of block 136 may be performed in addition to temperature measurements, may be performed instead of temperature measurements, and/or may be omitted.

Figure 18:
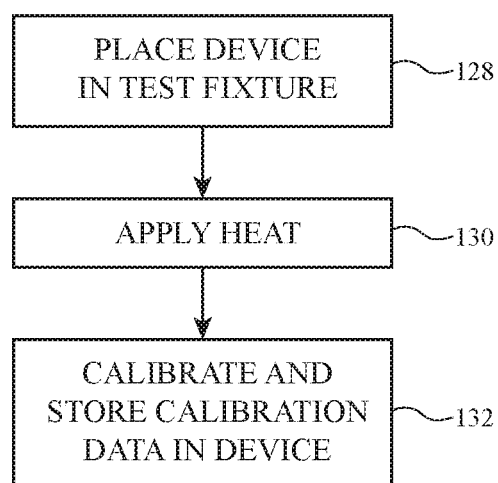
FIG. 18 is a flow chart of illustrative steps involved in calibrating temperature sensor circuitry in a wireless power transfer device in accordance with an embodiment.

To enhance temperature-based foreign object detection accuracy, temperature sensor circuitry in device 12 may be calibrated. Operations associated with calibrating device 12 are shown in FIG. 18. During the operations of block 128, a heated probe in a test fixture is placed adjacent to charging surface 60 (e.g. over a particular temperature sensor or set of temperature sensors). The rise in temperature measured by temperature sensors 57 for a known applied amount of heat with the probe is then determined so that the value of k in equation (1) can be determined and stored in device 12 along with other suitable calibration data.

Another type of calibration operation that is performed for device 12 involves temperature sensor components 82 (e.g., thermistors, resistance thermometers, etc.). Temperature sensor components 82 are subject to drift due to aging and other effects. If the component associated with an upper temperature sensor pad drifts relative to the component associated with a corresponding lower temperature sensor pad, computations of $\Delta$T may not be as accurate as possible. To compensate for component drift, once a day or at other suitable times when device 12 is in a steady state, control circuitry 42 uses each temperature sensor 57 to measure Ttop and Tbottom. Control circuitry also uses the additional temperature sensor components (e.g., additional thermistors or additional resistance thermometers) in printed circuit 72 to measure the temperature Tpc in corresponding lower portions of device 12 (e.g., in printed circuit 72). Based on the measured values of Ttop and Tpc at each sensor location, control circuitry 42 interpolates to determine an appropriate value for Tbottom at that sensor location and applies a corrective offset to the thermistor, resistance thermometer, or other temperature sensor component associated with temperature Tbottom at that sensor location, thereby calibrating the bottom temperature sensor component at that sensor location. Calibration data for this offset is stored in memory in control circuitry 42 for all temperature sensors 57 for use during subsequent measurements.

Device 12 may also be calibrated to take into account heating due to the operation of coils 36 (separate and apart from foreign object heating while coils 36 are operating). As an example, temperature measurements can be gathered from each of temperature sensors 57 as each of coils 36 is driven with a modulated current I (and therefore a modulated power P, as described in connection with FIG. 11). The transfer function H=$\Delta$T/I$^2$ is then computed as a function of modulation frequency. Device 12 is calibrated by determining a corresponding H between each coil and each of temperature sensors 57. This information is stored in device 12. Later, when computing any of the temperature-based values in the foreign object detection methods of FIGS. 8-13, temperature data that is gathered (e.g., values of Ttop and Tbottom from temperature sensor component 82) are corrected by using information about transfer function H to determine which parts of these temperatures are due to coil-induced heating (separate from coil-induced heating of objects on surface 60). The portion of the temperature values due to coil-induced heating can be subtracted from the temperature sensor component output data so that corrected Ttop and Tbottom data are produced (e.g., so that Ttop and Tbottom values are corrected for direct wireless heating of the temperature sensor pads during wireless power signal transmission). If desired, temperature sensor component drift can also be compensated for when producing the values of Ttop and Tbottom as described in connection with using temperature sensor components in printed circuit 72.

Figure 19:
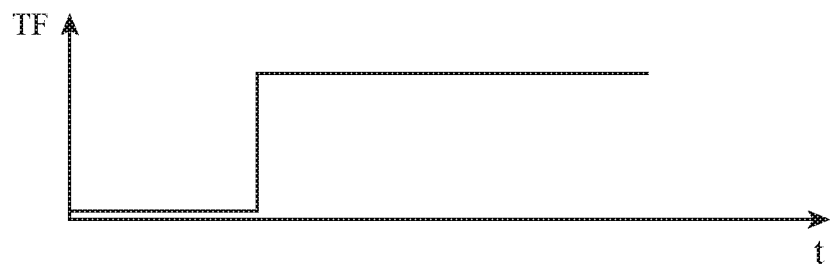
FIG. 19 is a graph showing how a calibration system may apply heat to a wireless power transfer device to gather thermal-lag-correction data in accordance with an embodiment.
Figure 20:
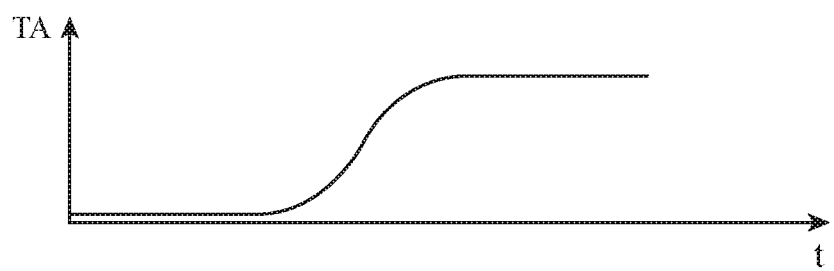
FIG. 20 is a graph showing how temperature in a wireless power transfer device may change in response to the illustrative applied heat of FIG. 17 in accordance with an embodiment.
Figure 21:
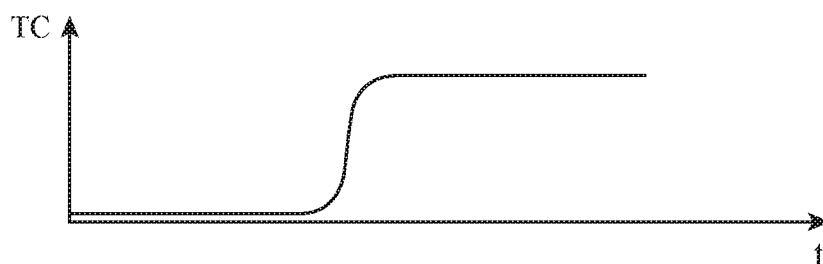
FIG. 21 is a graph showing how a temperature measurement in a wireless power transfer device may change in response to the illustrative applied heat of FIG. 17 following application of a time-based thermal-lag-correction function to the temperature measurement in accordance with an embodiment.

Another technique that can be used for ensuring that temperature measurements for foreign object detection are accurate is illustrated in connection with the graphs of FIGS. 19, 20, and 21. FIG. 19 is a graph of an illustrative temperature step produced by a heated probe in a test fixture. When this abrupt temperature step is applied to charging surface 60, the temperatures Ttop and Tbottom (collectively TA in FIG. 20) rise at a slower rate as shown in the illustrative curve of FIG. 20. The delay of the measured temperature rise TA of FIG. 20 when compared to the abrupt step in applied temperature TF of FIG. 19 is due to thermal lag associated with the heating the layers of material between charging surface 60 and temperature sensors 57. This lag can be compensated by applying a thermal lag correction function to time-dependent measurements of temperature TA (e.g., to time-dependent measurements of Ttop and/or time-dependent measurements of Tbottom), thereby producing corresponding lag-corrected temperature measurements such as lag-corrected temperature measurement TC of FIG. 21.

In general, any suitable calibration techniques may be used in correcting temperature measurements made by temperature sensors 57 such as drift-compensation techniques, compensation techniques that account for coil-induced temperature rise in temperature sensors 57 separate from foreign-object-induced heating, and thermal lag correction techniques (as examples).

Figure 22:
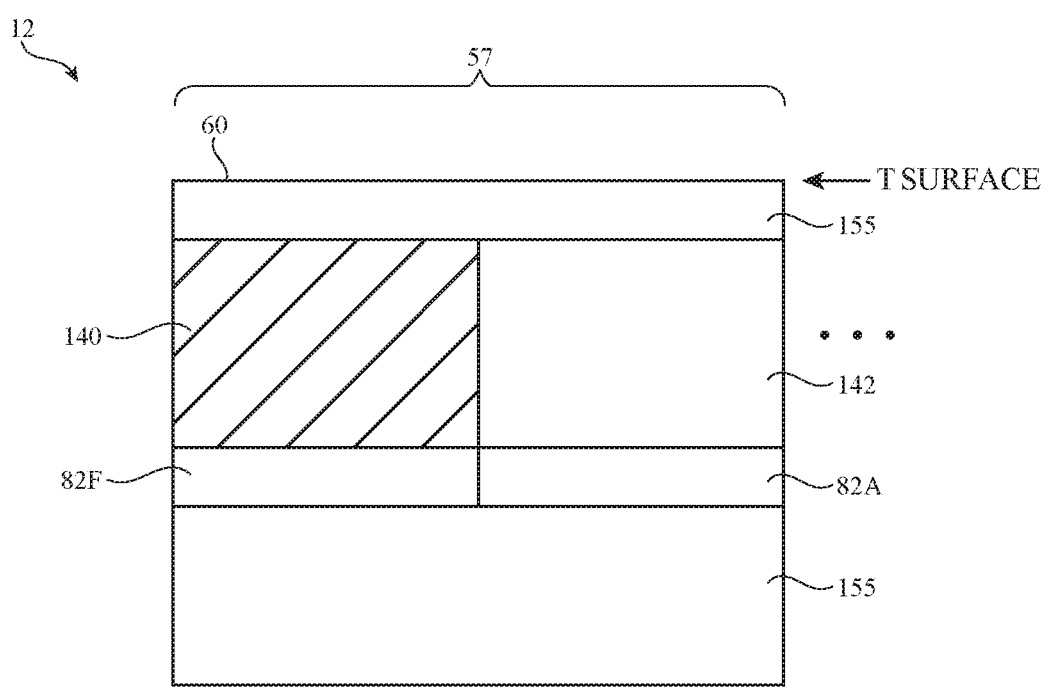
FIG. 22 is a cross-sectional side view of an illustrative wireless power transmitting device showing a temperature sensor configured to measure heat flux in accordance with an embodiment.

Temperature sensors for device 12 may, if desired, have temperature sensing devices with arrangements that differ from the illustrative arrangement of FIG. 4. Consider, as an example, the arrangement of FIG. 22. Device 12 of FIG. 22 has an array of temperature sensors 57 configured to make temperature measurements. Structures 155 include coils 36 (e.g., coils that are located below the temperature sensors and that are overlapped by the temperature sensors) and associated structures such as polymer layers, metal layers, ferrite layers, and/or other structures for forming a housing and other structures for device 12. The upper portion of structures 155 forms charging surface 60. Structures 140 may overlap temperature sensing components such as component 82F and structures 142 may overlap temperature sensing components such as component 82A. Structures 140 and 142 may include air gaps, polymer structures, metal structures (e.g., optional temperature sensor metal pads and/or vias), and/or other structures. The thermal conductivity of structures 140 and the portion of structures 155 interposed between temperature sensing component 82F and charging surface 60 is greater than the thermal conductivity of structures 142 and the portions of structures 155 interposed between temperature sensing components 82A and charging surface 60. As a result, there is a greater thermal resistance between temperature sensing component 82A and charging surface 60 than between temperature sensing component 82F and charging surface 60. The thermal sensing devices formed from components 82F and 82A therefore respond differently to a heated object on surface 60. There is more thermal resistance between surface 60 and component 82A than between surface 60 and component 82F, so component 82F tends to react quickly while component 82A serves to measure the ambient temperature of the interior of device 12. When a heated object is present on device 12 and surface 60 is heated, there will be a temperature gradient (high-to-low) established between surface 60 and the interior of device 12 and this gradient (and therefore the heat flux flowing through surface 60) can be measured using the differential temperature sensing arrangement of FIG. 22 or other heat flux measurement arrangements.

Figure 23:
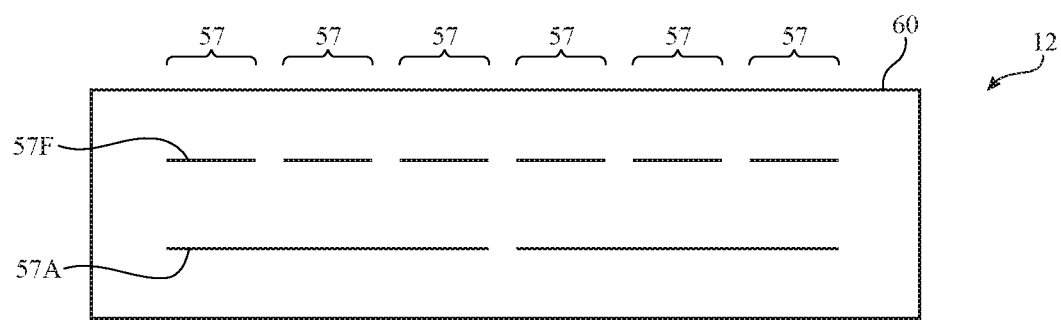
FIGS. 23 and 24 are further cross-sectional side views of illustrative wireless power transmitting devices for measuring heat flux in accordance with embodiments.
Figure 24:
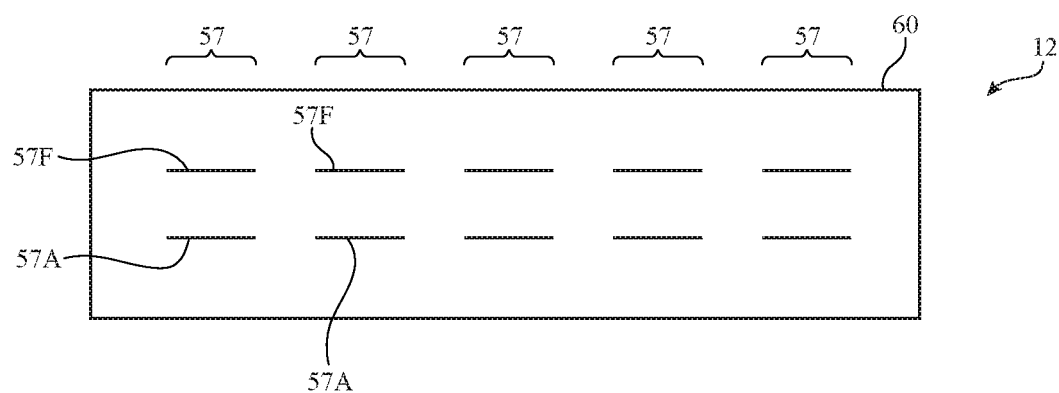

FIG. 23 shows how the array of temperature sensors 57 in device 12 may have two different sets of temperature sensing devices. Temperature sensing devices 57F may be formed closer to charging surface 60 than temperature sensing devices 57A and/or the structures between devices 57F and surface 60 may have lower thermal resistance than the structures between devices 57A and surface 60, thereby allowing heat flux to be measured (e.g., by measuring temperature gradients using these sets of sensors). There need not be an equal number of devices 57F in the first set of devices and devices 57A in the second set of devices. As shown in FIG. 23, for example, there may be more devices 57F than devices 57A (e.g., to reduce complexity without sacrificing a desired amount of lateral temperature measurement resolution). Each temperature sensor 57 therefore includes a respective one of devices 57F but multiple sensors 57 share a given one of devices 57A. In the illustrative arrangement of FIG. 24, each temperature sensor 57 includes a respective sensing device 57F and a respective sensing device 57A. Other configurations with differing numbers of temperature sensing devices in the first and second sets of temperature sensing devices may be used, if desired.

The foregoing is illustrative and various modifications can be made to the described embodiments. The foregoing embodiments may be implemented individually or in any combination.

What is claimed is:

1. A wireless power transmitting device with a charging surface configured to receive a wireless power receiving device that has a wireless power receiving coil, the wireless power transmitting device comprising:
   at least one coil;
   wireless power transmitting circuitry coupled to the at least one coil to transmit wireless power signals to the wireless power receiving device;
   an array of temperature sensors overlapping the at least one coil and extending across the charging surface; and
   control circuitry configured to detect a foreign object on the charging surface based on temperature information gathered with the temperature sensors, wherein the array of temperature sensors is configured to measure heat flux through the charging surface to predict the temperature at the charging surface.

2. The wireless power transmitting device of claim 1 wherein the control circuitry is configured to interrupt charging based on differential temperature information of said temperature sensors.

3. The wireless power transmitting device of claim 1 wherein the array of temperature sensors includes a first set of temperature sensing devices and a second set of temperature sensing devices, wherein the temperature sensing devices of the first set of temperature sensing devices are separated from the charging surface by a first thermal resistance and wherein the temperature sensing devices of the second set of temperature sensing devices are separated from the charging surface by a second thermal resistance that is greater than the first temperature resistance.

4. The wireless power transmitting device of claim 3 wherein the first set of temperature sensing devices has first temperature sensing pads thermally coupled to respective first temperature sensor components, wherein the second set of temperature sensing devices has second temperature sensing pads thermally coupled to respective second temperature sensor components, and wherein the wireless power transmitting device comprises a layer of dielectric between the first and second temperature sensing pads.

5. The wireless power transmitting device of claim 3 wherein the array of temperature sensors is configured to measure a first set of temperatures using the first set of temperature sensing devices and is configured to measure a second set of temperatures using the second set of temperature sensing devices.

6. The wireless power transmitting device of claim 5 wherein the temperature information includes the first set of temperatures and wherein the control circuitry is configured to detect the foreign object based on the first set of temperatures.

7. The wireless power transmitting device of claim 6 wherein the temperature information includes the second set of temperatures and wherein the control circuitry is configured to detect the foreign object based on the first and second sets of temperatures.

8. The wireless power transmitting device of claim 5 wherein the control circuitry is configured to detect the foreign object based on the predicted temperature of the charging surface.

9. The wireless power transmitting device of claim 5 wherein the control circuitry is configured to determine a transfer function associated with the first and second sets of temperatures and the wireless power signals and is configured to use the transfer function to detect the foreign object.

10. The wireless power transmitting device of claim 9 wherein the control circuitry is configured to determine the transfer function by amplitude modulation of the wireless power signals while the wireless power receiving device is not receiving the wireless power signals.

11. The wireless power transmitting device of claim 9 wherein the control circuitry is configured to determine the transfer function by measuring coil currents while the wireless power receiving device is receiving the wireless power signals.

12. The wireless power transmitting device of claim 1 further comprising a layer of additional temperature sensors that is overlapped by the array of temperature sensors, wherein the control circuitry is configured to create temperature offsets for temperature sensing devices in the array of temperature sensors based on information from the layer of additional temperature sensors.

13. The wireless power transmitting device of claim 1 wherein the control circuitry is configured to detect the foreign object by comparing a rate of temperature change measured with a given one of temperature sensors to a predetermined rate of temperature change threshold.

14. The wireless power transmitting device of claim 1 wherein the control circuitry is configured to interrupt charging by comparing a rate of temperature change measured at two or more sensors to a precalculated set of acceptable rate of change patterns.

15. The wireless power transmitting device of claim 1 wherein the control circuitry is configured to interrupt charging by comparing a rate of temperature change measured at two or more sensors to a precalculated set of acceptable rate of change patterns, where the acceptable patterns are based on wirelessly communicating with said wireless power receiving device.

16. The wireless power transmitting device of claim 1 further comprising coil impedance or mutual impedance measurement circuitry, wherein the control circuitry is configured to gather the temperature information in response to detection of a change in coil impedance of the at least one coil using the coil impedance measurement circuitry.

17. The wireless power transmitting device of claim 1 wherein the control circuitry is configured to correct temperature measurements made with the temperature sensors by taking into account portions of the temperature measurements due to wireless heating of temperature sensor pads in the temperature sensors by the wireless power signals.

18. The wireless power transmitting device of claim 1 wherein the control circuitry is configured to apply a thermal-lag-correction function to temperature measurements from the temperature sensors to produce corresponding lag-corrected temperature measurements and wherein the control circuitry is configured to detect the foreign object based on the lag-corrected temperature measurements.

19. A wireless power transmitting device with a charging surface configured to receive a wireless power receiving device that has a wireless power receiving coil, the wireless power transmitting device comprising:
a coil;
wireless power transmitting circuitry coupled to the coil to transmit wireless power signals to the wireless power receiving device;
a temperature sensor that overlaps the coil and that is configured to gather temperature information, wherein the temperature sensor includes a first temperature sensor pad configured to gather a first temperature, a second temperature sensor pad configured to gather a second temperature, and a layer of dielectric between the first and second temperature sensor pads, wherein the first temperature sensor pad is separated from the charging surface by a first thermal resistance, and wherein the second temperature sensor pad is separated from the charging surface by a second thermal resistance that is different than the first thermal resistance; and
control circuitry configured to detect a foreign object on the charging surface by measuring heat flow in the charging surface based on the temperature information gathered with the temperature sensor.

20. The wireless power transmitting device of claim 19 wherein the temperature sensor comprises:
a via through the layer of dielectric; and
a first temperature sensor component thermally coupled directly to the first temperature sensor pad and a second temperature sensor component thermally coupled through the via to the second temperature sensor pad.

21. The wireless power transmitting device of claim 20 wherein the layer of dielectric comprises a printed circuit substrate, wherein the first temperature sensor pad is formed from a first metal trace having first fingers separated by first slots on a first surface of the printed circuit substrate, and wherein the second temperature sensor pad is formed from a second metal trace having second fingers separated by second slots on an opposing second surface of the printed circuit.

22. A wireless power transmitting device with a charging surface configured to receive a wireless power receiving device that has a wireless power receiving coil, the wireless power transmitting device comprising:
a dielectric layer forming the charging surface;
an array of coils in a coil layer;
wireless power transmitting circuitry coupled to the array of coils to transmit wireless power signals to the wireless power receiving device; and
an array of temperature sensors interposed between the dielectric layer and the array of coils that is configured to measure heat flux through the charging surface.

23. The wireless power transmitting device of claim 22 further comprising:
control circuitry configured to detect a foreign object on the charging surface based on temperature information gathered with the temperature sensors and configured to halt transmission of the wireless power signals to the wireless power receiving device in response to detecting the foreign object, wherein the array of temperature sensors includes a first set of temperature sensing devices and a second set of temperature sensing devices, wherein the temperature sensing devices of the first set of temperature sensing devices are separated from the charging surface by a first thermal resistance and wherein the temperature sensing devices of the second set of temperature sensing devices are separated from the charging surface by a second thermal resistance that is greater than the first temperature resistance.

24. The wireless power transmitting device of claim 22 further comprising:
  control circuitry configured to:
    detect a foreign object on the charging surface based on temperature measurements gathered with the temperature sensors; and
    to trigger use of the array of temperature sensors to make the temperature measurements based on (1) electromagnetic impedance measurements on the coils and (2) detection of thermal changes using information from the array of temperature sensors.

* * * * *